United States Patent
Leermann et al.

(10) Patent No.: US 10,000,669 B2
(45) Date of Patent: Jun. 19, 2018

(54) METHOD OF MAKING A CABLE WRAP

(71) Applicant: certoplast Technische Klebebaender GmbH, Wuppertal (DE)

(72) Inventors: Timo Leermann, Wuppertal (DE); Peter Rambusch, Wuppertal (DE); Kay Ruhnau, Wuppertal (DE); Andreas Hohmann, Wuppertal (DE)

(73) Assignee: CERTOPLAST TECHNISCHE KLEBEBAENDER GMBH, Wuppertal (DE)

( * ) Notice: Subject to any disclaimer, the term of this patent is extended or adjusted under 35 U.S.C. 154(b) by 0 days. days.

(21) Appl. No.: 15/324,086

(22) PCT Filed: Aug. 11, 2015

(86) PCT No.: PCT/EP2015/068499
§ 371 (c)(1),
(2) Date: Jan. 5, 2017

(87) PCT Pub. No.: WO2016/023921
PCT Pub. Date: Feb. 18, 2016

(65) Prior Publication Data
US 2017/0198174 A1 Jul. 13, 2017

(30) Foreign Application Priority Data
Aug. 12, 2014 (DE) .................. 10 2014 111 494

(51) Int. Cl.
*H01B 13/08* (2006.01)
*B32B 7/14* (2006.01)
(Continued)

(52) U.S. Cl.
CPC .............. *C09J 7/0296* (2013.01); *B32B 7/12* (2013.01); *B32B 37/12* (2013.01); *B32B 37/142* (2013.01);
(Continued)

(58) Field of Classification Search
CPC . B32B 2405/00; B32B 2457/00; B32B 37/12; B32B 37/142; B32B 7/12;
(Continued)

(56) References Cited

U.S. PATENT DOCUMENTS 4,327,246 A    4/1982   Kincaid
4,898,640 A *  2/1990   O'Connor ............... B32B 15/08
                                                       156/204

(Continued)

OTHER PUBLICATIONS

English translation of DE102011079114.*
English translation of EP1312097.*
English translation of abstract of EP1875573.*

*Primary Examiner* — Sonya Mazumdar
(74) *Attorney, Agent, or Firm* — Andrew Wilford

(57) ABSTRACT

The subject matter of the invention is a method for the production of a cladding (1) for elongated material (2), in particular a sheath for cable sets. In this context, two adhesive tapes (3, 4) that are provided at least on one side with an adhesive coating (3) are axially spaced apart from one another by means of a carrier tape (5) are joined to form a laminate (3, 4, 5). For this purpose, both adhesive tapes (3, 4) are each joined, on the side thereof with the adhesive coating, with the carrier tape (5), in the longitudinal direction, while defining a free region (6) limited by both adhesive tapes (3, 4). According to the invention, the carrier tape (5) is configured free of adhesive coating and is only provided with an own adhesive coating (7) at least in the free region (6) after the laminate (3, 4, 5) has been produced.

11 Claims, 1 Drawing Sheet

(51) Int. Cl.
*B32B 37/02* (2006.01)
*B32B 37/12* (2006.01)
*C09J 7/02* (2006.01)
*C09J 5/06* (2006.01)
*C09J 133/00* (2006.01)
*B32B 7/12* (2006.01)
*B32B 37/14* (2006.01)
*B65H 69/02* (2006.01)

(52) U.S. Cl.
CPC ............... C09J 5/06 (2013.01); C09J 7/0242 (2013.01); C09J 133/00 (2013.01); *B32B 2405/00* (2013.01); *B32B 2457/00* (2013.01); *C09J 2203/302* (2013.01); *C09J 2433/00* (2013.01)

(58) Field of Classification Search
CPC ..................... C09J 133/00; C09J 2203/302; C09J 2433/00; C09J 5/06; C09J 7/0242; C09J 7/0296

USPC ........................... 156/53, 184, 291, 295, 305
See application file for complete search history.

(56) References Cited

U.S. PATENT DOCUMENTS

| | | | |
|---|---|---|---|
| 5,278,356 A * | 1/1994 | Miller | H02G 3/266 174/117 A |
| 6,936,553 B2 | 8/2005 | Samson-Himmelstjerna | |
| 7,132,028 B1 | 11/2006 | Wahlers-Schmidlin | |
| 7,282,250 B2 | 10/2007 | Musahl | |
| 2005/0069666 A1 * | 3/2005 | Ferrand | F16L 57/00 428/40.1 |
| 2007/0173156 A1 * | 7/2007 | Kulper | B32B 7/12 442/286 |
| 2009/0277570 A1 * | 11/2009 | Caveney | G09F 3/0295 156/184 |
| 2013/0017746 A1 | 1/2013 | Auktun | |
| 2017/0271051 A1 * | 9/2017 | Hohmann | H02G 3/0481 |

* cited by examiner

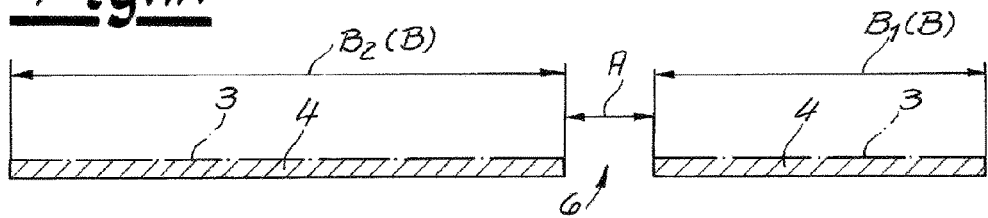
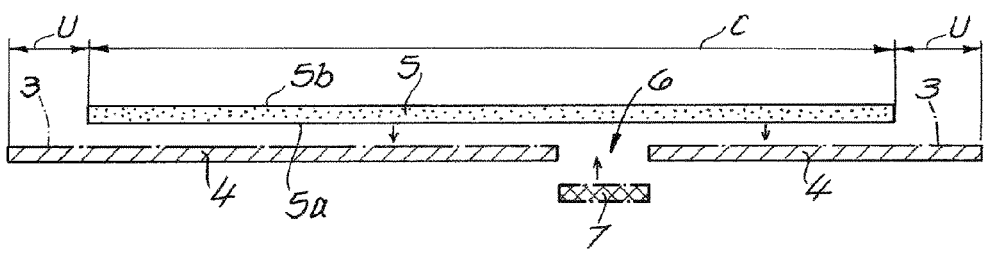
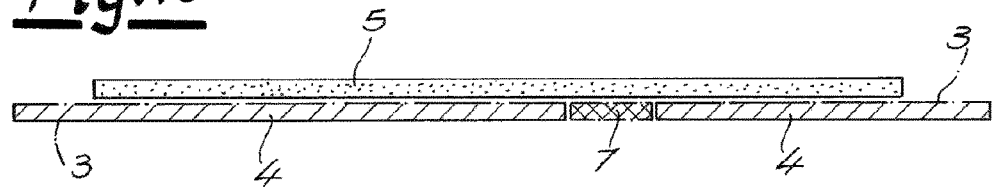
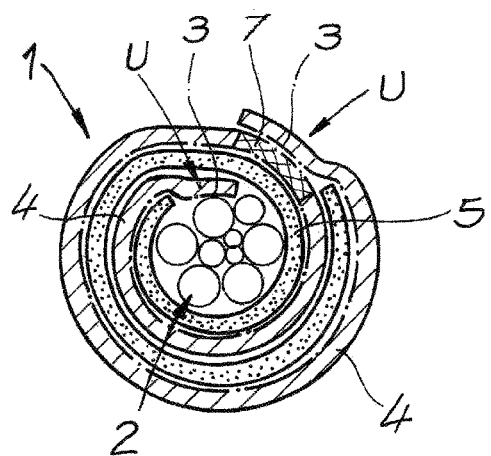

METHOD OF MAKING A CABLE WRAP

CROSS REFERENCE TO RELATED APPLICATIONS

This application is the US-national stage of PCT application PCT/EP2015/068499 filed 11 Aug. 2015 and claiming the priority of German patent application 102014111494.9 itself filed 12 Aug. 2014.

The invention relates to a method of making a wrap for an elongated object, particularly a sheath for a cable set, according to which two axially extending adhesive tapes each provided at least on a back face with an adhesive coating and spaced from one another by a support tape are joined together to form a laminate and, for this purpose, the two adhesive tapes are each joined along their longitudinal length with the support tape on a front face thereof with the adhesive coating while defining a gap delimited by the two adhesive tapes, and according to which the support tape is made free of adhesive coating.

One method having the configuration described at the outset such as that described in DE 10 2011 079 114 [US 2013/0017746] involves an adhesive tape and a covering which, according to the illustrated embodiment shown there in FIG. 3, has two adhesive tapes on its top face in each edge region. In fact, the two adhesive tapes are applied in the edge region in question such that the adhesive tapes overlap over the edge of the covering. The covering is preferably of such a type that is not provided with adhesive compound and is made of a colored textile substrate.

In another method described in U.S. Pat. No. 4,327,246 the procedure is such that two adhesive tapes are provided with a common substrate. The two adhesive tapes are each laminated onto and offset from each other in the direction of travel on the face with the adhesive compound. To wrap elongated object, the adhesive tape in question is aligned parallel to it and then wrapped around the elongated object. As an alternative to this longitudinal wrapping, it is also proposed in U.S. Pat. No. 4,327,246, which is relevant here, that the adhesive tape can be guided in a spiral-shaped or helical movement around the elongated object.

A comparable approach is described in the framework of EP 1 875 573 [U.S. Pat. No. 7,132,028]. There, a total of three adhesive tapes are used. First, a first and a second adhesive tape provided with adhesive on one face are each laminated, while offset from each other, in the direction of travel on the face provided with adhesive compound. At the free edge of the first adhesive tape of the sheath, a third adhesive tape provided with adhesive on one face is then placed onto the first adhesive tape on the face with the adhesive compound and laminated on with offset. The third adhesive tape is arranged on the same face of the first adhesive tape as the second adhesive tape.

In this way, a possibility is intended to be provided for wrapping individual lines into cable sets, thereby providing a high degree of protection against mechanical stress as a result of abrasion and friction on sharp edges, ridges, and welds. Manufacture is expensive, however, since a total of three adhesive tapes provided with adhesive on one face are laminated onto one another in a certain process sequence with offset. During this procedure, contact occurs between the adhesives, so that any corrections are not possible. Moreover, it is laborious to handle adhesive tapes having adhesive on one face, so protective films must be used where appropriate.

EP 1 312 097 [U.S. Pat. No. 7,282,250] relates to a wrap for enclosing an elongated object. This sheath has a covering in which a self-sticking adhesive tape is present in a narrow edge region. Moreover, another, second self-sticking adhesive tape is present. The two adhesive tapes extend along the longitudinal edges of the covering. Overall, the aim is to enable simple, cost-effective and fast wrap. For this purpose, the covering itself is embodied so as to be free of adhesive compound, so that it cannot contribute to the adhesion. This is where the invention comes in.

The object of the invention is to develop a method of making a sheath for an elongated object whereby production is simplified and lower overall costs are observed.

To attain this object, a generic method of making a wrap for an elongated object is characterized in the context of the invention in that the support tape is provided with an adhesive coating at least partially in the gap only after the laminate is produced.

That is, the gap between the two self-sticking adhesive tapes is provided in whole or in part with the subsequently applied adhesive coating. In this context, it is possible to work with an adhesive coating over the entire surface of the gap. However, it is also possible to provided a strip of coating in the gap, and this possibility is included by the invention. In any case, the support tape has a more or less pronounced adhesive coating in the gap that is ultimately used to seal the wrap when enclosing the elongated object.

For starters, the invention thus consciously dispenses with the handling and processing of three adhesive tapes, each of which is provided with adhesive on one face, which is mandatory in relation to the teaching according to EP 1 875 573.

Instead, only two adhesive tapes that are provided on at least one face with an adhesive coating are joined together to form the laminate. The support tape is made according to the invention so as to be free of an adhesive coating makes this possible. In this way, handling is simplified, and the two adhesive tapes can be easily joined together with the support tape, especially since the two adhesive tapes are aligned in relation thereto so as to extend axially and be spaced from one another.

Unlike in EP 1 312 097, the support tape is consciously provided according to the invention with an additional adhesive coating, particularly at least partially in the gap between the two adhesive tapes that have been provided with adhesive on one face. What is more, the two adhesive tapes with adhesive on one face are not joined according to the invention with the support tape in a narrow edge region. Rather, the width of the support tape corresponds at least to the width of the wider of the two adhesive tapes and can have a width of up to the sum of the widths of the two adhesive tapes. Moreover, the gap between the two adhesive tapes is usually dimensioned such that it is approximately half to twice the width of the narrower adhesive tape. That is, the spacing is designed to be smaller than twice the smallest width of the adhesive tape of narrower width.

The support tape is typically a textile web material. In principle, a plastic film, a paper film, a paper web, or another laminar material can also be used here. Insofar as the substrate material is embodied as a textile web material, laminar nonwoven materials, fabrics, warp-knitted fabrics, and felt or foam layers have proven effective. What all of these materials have in common is that the mass per unit area is generally less than 500 g/m$^2$ and particularly even less than 200 g/m$^2$.

According to the invention, the support tape is also free of an adhesive coating, meaning that it does not have any adhesive coating. Of course, coatings such as a lacquer coat are also conceivable in principle. For reasons of cost, this will usually be dispensed with, and the support tape will be designed to not only be free of an adhesive coating, but also generally free of coatings.

By virtue of the adhesive coating-free design of the support tape, it can be joined together without any difficulty with the two adhesive tapes with adhesive on one face to form the laminate. After all, all that is required for this purpose is that the two adhesive tapes be each joined together with the support tape extending longitudinally on the face with the adhesive. That is, in the simplest of cases, the support tape is simply adhered to the adhesive coatings of the adhesive tapes.

This is usually done in such a way that the two adhesive tapes are on a common front face of the support tape. Moreover, the procedure adopted is such that the two adhesive tapes define the longitudinally extending gap delimited between them. That is, the gap that is bordered at its longitudinal edges by the inner edges of the two adhesive tapes and thus is between the two adhesive tapes. In this gap, one can see the support tape or its front face, whereas the remaining front face of the support tape is covered or concealed by the two adhesive tapes.

According to the invention, at least this gap is now provided with an adhesive coating after manufacture of the laminate. In the simplest of cases, this can be achieved by applying the adhesive coating with the aid of a mask to the front face of the support tape such that the gap is filled out by the adhesive coating. Alternatively, the adhesive coating can also be carried by a transfer tape or transfer film and then applied with the aid of the transfer tape or transfer film to the gap on the front face of the support tape or to the front face. By contrast, the back face of the support tape remains free of an adhesive coating, and usually even is completely without a coating.

The overall approach taken here is to provide the gap at least partially with the adhesive coating. That is, the adhesive coating applied subsequently to the support tape covers the gap at least in part. As will readily be understood, the adhesive coating can also extend beyond it. According to the invention, that is the case if, after manufacture of the laminate, the gap is provided with the adhesive coating and the adhesive coating extends beyond the gap in question.

As a rule, the procedure adopted is such that the adhesive coating applied to the support tape either completely fills the gap or overlaps with the flanking adhesive tapes on one or both edges. In this connection, overlapping of possibly 10% up to a maximum of 20% with respect to the total width of the gap is permitted in order to prevent the consumption of adhesive for the adhesive coating of the support tape from running unnecessarily high. To a greater degree, this design rule ensures that the gap is filled with the aid of the adhesive coating for the support tape in all cases, with overlapping at the edge within the stated limits being permitted up to a maximum of 20% with respect to the width of the gap.

As explained previously, the two adhesive tapes are joined together with the support tape to form the longitudinally extending laminate with consideration of axial spacing. It has proven expedient if this axial spacing between the two adhesive tapes normally fills from half of the smallest width up to two times this smallest width of the adhesive tape. This design rule accounts for the fact that the laminate produced according to the described method is wrapped longitudinally around the elongated object. The adhesive coating in the gap typically provides for sealing at one edge of the longitudinal sheath produced in this way, for which reason the above-mentioned width of the gap and, consequently, of the axial spacing is sufficient in this context.

The two adhesive tapes can have the same width overall. It is also possible, however, to work with adhesive tapes having different widths. That ultimately depends on the diameter of the elongated object to be enclosed. If the two adhesive tapes have different widths, a width ratio from 1:1 to 1:10 and preferably 1:1 to 1:5 is usually observed. Moreover, the configuration is normally set up such that the width of the support tape corresponds approximately to the width of the wider of the two adhesive tapes, and it can be configured so as to equal to up to a maximum of the summed width of the two adhesive tapes.

To begin with, a stable configuration of the laminate is provided in this way. This design rule also ensures that the two adhesive tapes are joined together with the support tape with lateral overhang at each edge. This lateral overhang corresponds in terms of width approximately to the gap or exceeds same (in each case). The lateral overhang ensures that the sheath made in this way is securely adhered to the elongated object during longitudinal wrapping, thereby providing satisfactory protection from damage as a result of abrasion, ridges, etc.

It has also proven expedient in this regard if the two adhesive tapes are joined together with the support tape with approximately the same lateral overhang. After all, this has the consequence that the laminate is oriented on these two overhangs with the respective outwardly facing adhesive coatings of the adhesive tapes. That is, as a result of the overhangs, the laminate has the outwardly facing adhesive coating of the associated adhesive tape in the region of the overhang.

It will be usual practice to work with different overhangs. In fact, a first adhesive tape joined together with the support tape usually corresponds to a fixing strip. That is, the adhesive coating of this first adhesive tape ensures that the wrap is fixed to the elongated object. On the other hand, the second adhesive tape provides for the closure of the wrap after the longitudinal wrapping around the elongated object. The overhang of the closure strip implemented in this way is usually larger in terms of its width than the width of the fixing strip. In fact, what is observed here is a ratio of the widths of the two overhangs and consequently of the fixing strip to the closure strip in the range from 1:1 to 1:5 and preferably in the range from 1:1 to 1:3.

In any case, the two overhangs of the fixing strip and the closure strip in combination ensure that the wrap is fixed to the elongated object on the one hand and that the longitudinal wrap can be sealed on the other hand. One will usually proceed such that the laminate, with the adhesive coating on one overhang, is aligned parallel to the elongated object and fixed thereto. That is, with one lateral overhang and the adhesive coating provided there, the laminate is fixed or prefixed to the elongated object to be enclosed. The laminate or the wrap implemented in this way is then wrapped longitudinally around the elongated object. This results in longitudinal wrapping. Finally, the other, second overhang is adhered with the adhesive coating there to the longitudinal wrapping.

The other, second overhang or its adhesive coating, and consequently the closure strip, usually comes into contact with the adhesive coating of the support tape in the gap, so that the two adhesive coatings are adhered to one another, thereby providing an especially secure hold for the other, second overhang and hence for the end edge of the longitudinal wrapping or wrap. It will readily be understood that the width-based configuration and mounting are adapted to the dimensions and particularly to the diameters of the elongated object.—The object of the invention is also a sheath that is particularly suitable for the manufacture of a wrap for an elongated object. The sheath in question is described in claim 10.

As a result, a method of making a wrap for an elongated object and a corresponding sheath are described, both of which provide special mechanical protection for the elongated object. This usually involves one or more cable harnesses. Moreover, the wrap or sheath is normally used in connection with cable harnesses in automobiles. The wrap provides for the overall protection of the individual cable harnesses or cable sets against mechanical damage. Such damage can occur, for example, as a result of abrasion and friction in a motor vehicle and are controlled according to the invention.

The procedural approach according to the invention as well as the associated sheath can be produced in an especially simple and cost-effective manner. This is of particular importance against the background of the enormous price competition in the automobile sector. Herein lie the fundamental advantages.

The invention is explained in further detail below with reference to a schematic drawing, which illustrates only one illustrated embodiment:

FIGS. 1A to 1C show a method of making a wrap for an elongated object in various process stages, and FIG. 2 shows the wrap installed on the elongated object.

The drawing shows a wrap 1 for an elongated object 2. In the illustrated embodiment, and without constituting a restriction, the elongated object 2 is several grouped-together cable harnesses, cable sets, etc., in a motor vehicle. With the aid of the wrap 1, the elongated object 2 or the cable harnesses are enclosed along their longitudinal length. The wrap 1 therefore corresponds to a longitudinal wrapping as a sheath as shown in FIG. 2 and its manufacture is shown in detail in FIGS. 1A to 1C. Here, the wrap 1 and the various manufacturing steps are shown in an extended state.

During manufacture of the wrap 1, two adhesive tapes 3, 4 each provided with an adhesive coating 3 on at least one face, are first provided. In addition to the adhesive coating 3, the two adhesive tapes 3, 4 have a substrate 4. The substrate 4 can be a substrate made of a fabric or warp-knitted fabric. Normally, a PET (polyethylene terephthalate) fabric or also a polyamide fabric is used. In general, however, the substrate 4 can also be embodied as a velour substrate, warp-knitted fabric, or nonwoven mat. The substrate 4 is generally a textile substrate 4 that can in principle also be a nonwoven fabric.

The adhesive tape 3, 4 has a width B in the range from about 15 mm to 250 mm. Preferably, the width B lies in the range between 15 mm and 100 mm. The weight per unit area of the respective adhesive tape 3, 4 is in the range from 40 $g/m^2$ to 800 $g/m^2$ and preferably between 100 $g/m^2$ and 250 $g/m^2$. Its thickness may lie in the range from 0.1 mm to 5 mm and preferably in the range between 0.2 mm and 1 mm.

The adhesive coating 3 is an adhesive compound based on natural or synthetic rubber. An acrylate adhesive and, in particular, hot-melt adhesive is usually used. In principle, adhesive compounds based on silicone, polyurethane or polyester can also be used. In addition, adhesive compounds are also conceivable that are composed of 20 wt % to 85 wt % of a polyurethane or polyether as well as 15 wt % to 85 wt % of an adhesive resin that is compatible with the abovementioned component, as well as 0.01 wt % to 3 wt % of a crosslinking agent. As the application weight for the adhesive coating 3, the invention recommends values in the range between about 30 $g/m^2$ and 300 $g/m^2$.

The two adhesive tapes 3, 4 provided with the adhesive coating are axially spaced from one another with the aid of a support tape 5 and joined to form a laminate 3, 4, 5. For this purpose, the two adhesive tapes 3, 4 are joined together along their longitudinal length with the support tape 5 on the respective face with the adhesive layer, thus defining an empty gap 6 bordered by them. This can be seen by comparing FIG. 1A to FIG. 1B.

During this process, the support tape 5 is adhered to the adhesive coatings 3 of the adhesive tapes 3, 4. In this connection, the invention as a whole proceeds in such a way that the two adhesive tapes 3, 4 are carried on a common front face 5a of the support tape 5. It is of special inventive significance in this connection that the support tape 5 is coating-free on both its front face 5a and back face 5b and is particularly configured so as to be free of adhesive coating as a whole. That is, the support tape 5 is pressed directly onto the adhesive coating 3 of the adhesive tapes 3, 4 and adheres to the adhesive coating 3.

It is only after the laminate 3, 4, 5 is produced in this manner that the support tape 5 is provided with its own adhesive coating 7 at least in the gap 6, particularly at least in part. This can be seen by comparing FIG. 1B to FIG. 1C. In fact, in the illustrated embodiment, the invention proceeds such that the coating-free support tape 5 is first joined with its front face 5a with the adhesive coatings 3 of the adhesive tapes 3, 4. For this purpose, the two adhesive tapes 3, 4 are aligned so as to be axially spaced from one another. This applies to the support tape 5. After that, the adhesive tapes 3, 4 are joined to the support tape.

After the gap 6 between the confronting inner edges of the two adhesive tapes 3, 4 has been defined in this way, this gap 6 is provided with the adhesive coating 7. For this purpose, the adhesive can be applied to the support tape 5, more particularly to its front face 5a, by spraying through a mask into the gap 6 in question In the illustrated embodiment, the adhesive coating 7 being shown to be significantly thicker than the adhesive coatings 3. The purpose of this is only to clarify the manufacturing process and the arrangement of the adhesive coating 7. In fact, the adhesive coatings 3, 7 are normally applied with a comparable surface coating weight (mass per unit area) to the substrates 4, 5. This is usually in the range from 30 $g/m^2$ to 300 $g/m^2$, as was explained previously above relative to the adhesive coating 3.

Alternatively, it is also possible for the adhesive coating 7 to be present on a transfer film (not shown) and applied with the aid of the transfer film in the gap 6 to the support tape 5, more particularly to its front face 5a. Moreover, the additional possibility exists of placing the adhesive coating 7 in a contactless manner in the gap 6 onto the support tape 5. Various methods and approaches are available in this regard, for example so-called "kiss coating" or "curtain coating," as well as the previously mentioned spray-coating method.

From a topological perspective, the configuration as a whole is set up such that the two adhesive tapes 3, 4 are spaced apart along their longitudinal length by an axial spacing A that ranges from about half of the smallest width of the adhesive tapes 3, 4 to two times this smallest widths $B_1$, $B_2$. In the illustrated embodiment, the adhesive tape 3, 4 to the right in FIGS. 1A to 1C has the smaller width $B_1$ that in this case is greater than the axial spacing A between the two adhesive tapes 3, 4. The spacing A can correspond to values in the range between about 20 mm and 50 mm.

Accordingly, the gap 6 defined in this way also has a respective width A.

It can be seen that the two adhesive tapes 3, 4 have different widths $B_1$, $B_2$. The two adhesive tapes 3, 4 can obviously also have the same widths $B_1$, $B_2$. Moreover, in the illustrated embodiment, the width ratio $B_1$:$B_2$ is in the range between about 1:1 to 1:3. This width ratio $B_1$:$B_2$ can in fact assume values of up to 1:10.

The illustrated width C of the support tape 5 corresponds approximately to the width $B_2$ of the wider of the two adhesive tapes 3, 4. At most, the width C of the support tape 5 can correspond to the sum of the widths $B_1$, $B_2$ of the two adhesive tapes 3, 4. In other words:

$$C \approx B_2 \text{ to } B_1 + B_2.$$

Furthermore, it can be seen from the views that the two adhesive tapes 3, 4 are joined with the support tape 5 with a lateral overhang U at each edge. In the illustrated embodiment, each lateral overhang U is configured so as to be approximately equal on both the right and left edges of the support tape 5. The overall orientation and configuration of the laminate 3, 4, 5 ensures that the laminate 3, 4, 5 is oriented at its two overhangs U with the outwardly facing adhesive coatings 3 of the adhesive tapes 3, 4. With the aid of the overhang U and of the adhesive coating 3 of the adhesive tapes 3, 4 exposed there, the sheath or wrap 1 produced in this way is wrapped around the elongated object 2 to be enclosed as shown in detail in FIG. 2.

For this purpose, the laminate 3, 4, 5 is first fixed to the elongated object 2 with the adhesive coating 3 on the associated overhang U of the adhesive tape 3, 4 as shown to the right in the illustrated embodiment. The sheath is then wrapped longitudinally around the elongated object 2 according to the illustration in FIG. 1C. Finally, the other overhang U, which belongs to the adhesive tape 3, 4 to the left in the example, is adhered to the longitudinal wrap produced in this way. An especially intensive adhesion is obtained because the adhesive coating 3 of the overhang U to the left in this case corresponding to the illustration of FIG. 1C contacts the adhesive coating 7 of the support tape 5, and the two adhesive coatings 3, 7 are adhered to one another (cf. FIG. 2).

In the illustrated embodiment, the overhang U of the first adhesive tape 3, 4 corresponds with the smaller width $B_1$ to the so-called fixing strip, with the aid of which the first adhesive tape 3, 4, more particularly the overhang U there, is fixed to the elongated object 2 as shown in FIG. 2. The overhang U of the second adhesive tape 3, 4 having the width $B_2$ is usually designed to be bigger in terms of its width than the overhang U of the first adhesive tape 3, 4. The overhang U of the second adhesive tape 3, 4 corresponds to a closure strip. Consequently, the overhangs U, more particularly the width of the fixing strip in comparison to that of the closure strip, has a width ratio that is in the range from 1:1 to 1:5 and preferably in the range from 1:1 to 1:3.

It is obvious that, depending on the variation of the widths $B_1$, $B_2$, and C, different overall widths of the laminate 3, 4, 5 and also different sizes of the gap 6 and of its width A can be proposed and implemented. Not only the widths $B_1$, $B_2$, and C of the two adhesive tapes 3, 4 and of the support tape 5 play a role here, but also the overhangs U that are provided. Total widths of the laminate 3, 4, 5 in the range from about 80 mm to 600 mm can be obtained so that elongated objects 2 of very different diameters can be wrapped. As will readily be understood, these estimations are to be understood as being only for the sake of example and are of course not restrictive.

The invention claimed is:

1. A method of making a wrap for an elongated object, the method comprising the steps of:
adhering two axially extending adhesive tapes each provided at least on a back face with an adhesive coating at a spacing from one another to a support tape to form a laminate and, for this purpose, the two adhesive tapes being adhered along their longitudinal length with the support tape on a front face thereof with the adhesive coating while defining a gap delimited between the two adhesive tapes the support tape being free of adhesive coating; and
providing the support tape with an adhesive coating at least partially in the gap after formation of the laminate.

2. The method defined in claim 1, wherein the two adhesive tapes are spaced from one another by an axially or longitudinally extending spacing that is narrower than twice the smallest width of the respective adhesive tape.

3. The method defined in claim 1, wherein the two adhesive tapes are on a common front face of the support tape.

4. The method defined in claim 1, wherein the two adhesive tapes have the same or different widths.

5. The method defined in claim 4, wherein the two adhesive tapes are present in a width ratio from 1:1 to 1:10.

6. The method defined in claim 5, wherein a width of the support tape corresponds approximately to a width of the wider of the two adhesive tapes up to a sum of the widths of the two adhesive tapes.

7. The method defined in claim 1, wherein the two adhesive tapes have at outer edges lateral overhangs extending transversely past outer edges of the support tape and a width ratio of the lateral overhangs in the range from 1:1 to 1:5.

8. The method defined in claim 7, wherein in the laminate the outwardly facing adhesive coatings of the adhesive tapes are exposed at the two overhangs.

9. The method defined in claim 7, further comprising the steps of:
aligning the laminate with the adhesive coating on one overhang parallel to the elongated object and fixed thereto, then
wrapping the laminate longitudinally around the material and finally
adhering the laminate to the longitudinal wrap with the adhesive coating of the other, second overhang.

10. A sheath for wrapping an elongated object and made according to the method of claim 1.

11. A method of making a wrap for and applying the wrap to an elongated object, the method comprising the steps of sequentially:
adhering two adhesive tapes having adhesive-coated back faces to a front face of a support tape with inner edges of the adhesive tapes transversely spaced and defining a longitudinally extending gap at which the front face is exposed and outer edges of the adhesive tapes transversely overhanging outer edges of the support tape to form a laminate;
applying a longitudinally extending strip of adhesive to the front face in the gap of the laminate; and
wrapping the laminate around the object with a back face of the support tape directly against the object, the back face of one of the overhangs adhering directly to the object, the adhesive strip on the front face adhering to a back face of one of the adhesive tapes, and the back face of the other of the overhangs adhering to the adhesive strip.

* * * * *